(12) United States Patent
Liu

(10) Patent No.: US 8,248,779 B2
(45) Date of Patent: Aug. 21, 2012

(54) COMPUTER AND FIXING BRACKET THEREOF

(75) Inventor: Lei Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 383 days.

(21) Appl. No.: 12/699,055

(22) Filed: Feb. 3, 2010

(65) Prior Publication Data

US 2011/0090629 A1 Apr. 21, 2011

(30) Foreign Application Priority Data

Oct. 16, 2009 (CN) .......................... 2009 1 0308346

(51) Int. Cl.
*H05K 5/00* (2006.01)
*H05K 7/00* (2006.01)

(52) U.S. Cl. ................................ 361/679.4; 361/679.41

(58) Field of Classification Search ............... 361/679.4, 361/679.41
See application file for complete search history.

(56) References Cited

U.S. PATENT DOCUMENTS

| | | | | |
|---|---|---|---|---|
| 6,025,989 | A * | 2/2000 | Ayd et al. ........................ | 361/695 |
| 6,035,356 | A * | 3/2000 | Khan et al. ..................... | 710/301 |
| 6,564,274 | B1 * | 5/2003 | Heath et al. .................... | 710/105 |
| 6,920,049 | B2 * | 7/2005 | Brooks et al. .................. | 361/727 |

* cited by examiner

*Primary Examiner* — Anthony Haughton
(74) *Attorney, Agent, or Firm* — Altis Law Group, Inc.

(57) ABSTRACT

A computer includes a motherboard, a chassis to receive the motherboard, a peripheral component interconnect (PCI) card perpendicularly connected to the motherboard, a fan, and a fixing bracket. The chassis includes a fixing portion in parallel to the motherboard. The fixing bracket includes a base board defining an opening and a fixing element connected to the base board. The fan is mounted to the base board with a first side of the fan facing the opening, the base board is parallel to the PCI card, with a second side of the fan opposite to the first side facing the PCI card. Positions of the fasteners in the corresponding first slots are adjustable, to adjust a position that the fan is located on the base board. The assembly of the fan and the fixing bracket is used to improve cooling efficiency for the PCI card.

11 Claims, 7 Drawing Sheets

COMPUTER AND FIXING BRACKET THEREOF

BACKGROUND

1. Technical Field

The present disclosure relates to a computer and a fixing bracket of the computer for fixing a fan.

2. Description of Related Art

In a computer system, peripheral component interconnect (PCI) cards, such as video cards, will generate a large of heat during operation, which may affect the operational stabilization of the computer system. Although fans or other heat dissipating components are utilized to dissipate heat for the PCI cards, it is difficult to meet heat dissipating requirements because the fans or the heating dissipating components are often too small to efficiently dissipate heat.

DETAILED DESCRIPTION

Figure 1:
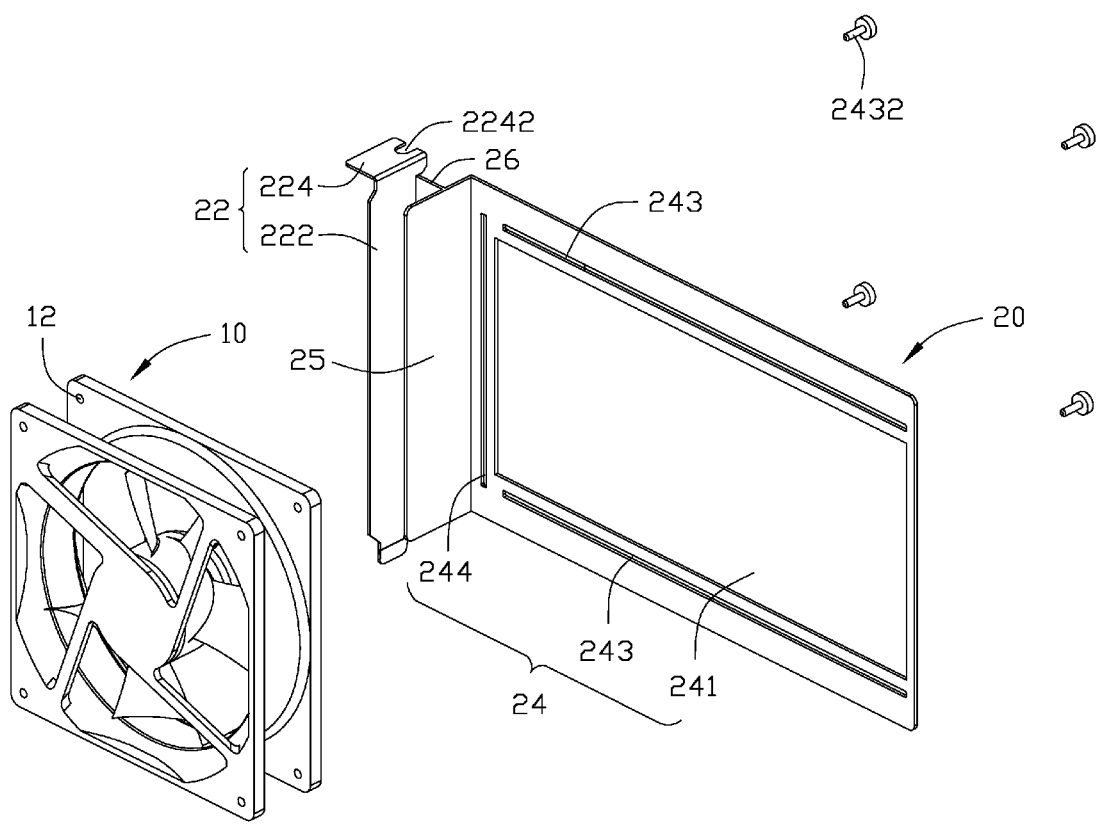
FIG. 1 is an exploded, isometric view of an exemplary embodiment of a fixing bracket together with a fan.
Figure 2:
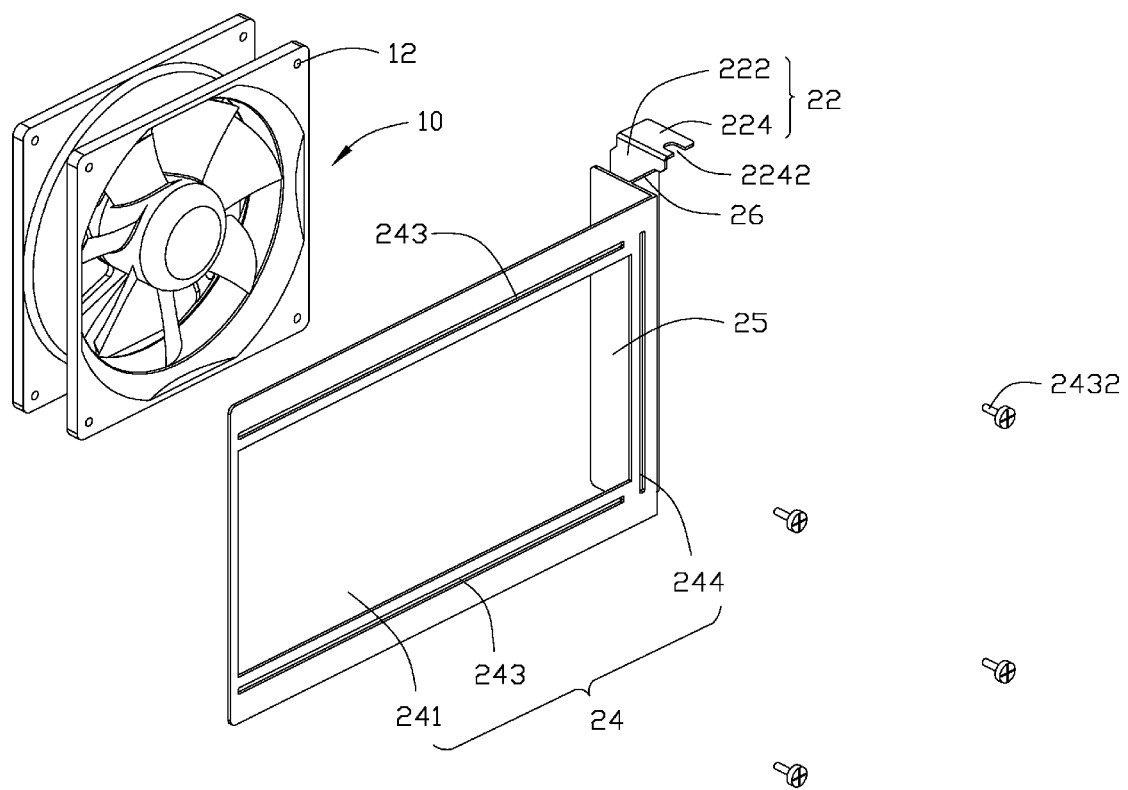
FIG. 2 is similar to FIG. 1, but viewed from another perspective.

Referring to FIGS. 1, 2, 6, and 7, an embodiment of a computer includes a chassis 30, a motherboard 40 mounted in the chassis 30, a peripheral component interconnect (PCI) card 50 perpendicularly connected to the motherboard 40, a fan 10, and a fixing bracket 20 for fixing the fan 60 to the chassis 30.

The chassis 30 includes a rear wall 31 perpendicular to the motherboard 40. A fixing portion 32 perpendicularly extends out from the rear wall 31 parallel to the motherboard 40. A plurality of spaced slots 33 is defined in the rear wall 31, under the fixing portion 32 and perpendicular to the motherboard 40. A plurality of fixing holes 322 is defined in the fixing portion 32, each fixing hole 322 is located between two adjacent slots 33.

The motherboard 40 includes a plurality of spaced PCI sockets 42, corresponding to and perpendicular to the plurality of slots 33, for mounting a plurality of PCI cards, for example, a bottom of the PCI card 50 is mounted to one of the plurality of PCI sockets 42.

Four screw holes 12 are defined in four corners of the fan 10.

The fixing bracket 20 includes a fixing element 22, a substantially L-shaped base board 24, and a connection plate 26. The fixing element 22 includes a cover plate 222 and a tab 224 perpendicularly extending from a top of the cover plate 222. An incision 2242 is defined in the tab 224. The base board 24 defines a rectangular opening 241 in a center, two parallel long first slots 243 at top and bottom sides of the opening 241, and a second slot 244 perpendicular to the first slots 243 and at an end of the opening 241. A flange 25 perpendicularly extends from an end of the base board 24, adjacent to the second slot 244. The connection plate 26 is perpendicularly connected between a side of the cover plate 222 of the fixing element 22 and the flange 25 of the base board 24.

Figure 3:
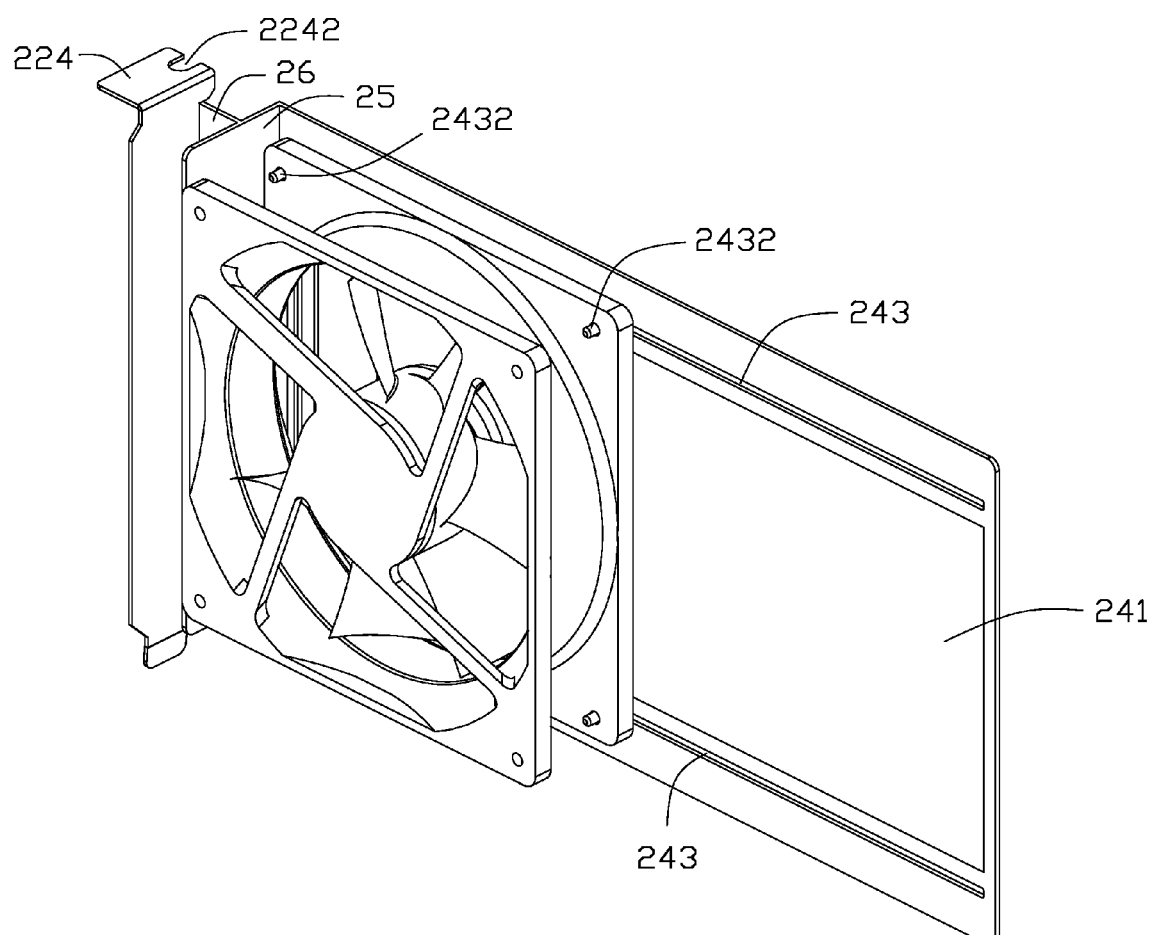
FIG. 3 is an assembled, isometric view of the fixing bracket and the fan of FIG. 1, showing the fan located at a first position of the fixing bracket.
Figure 4:
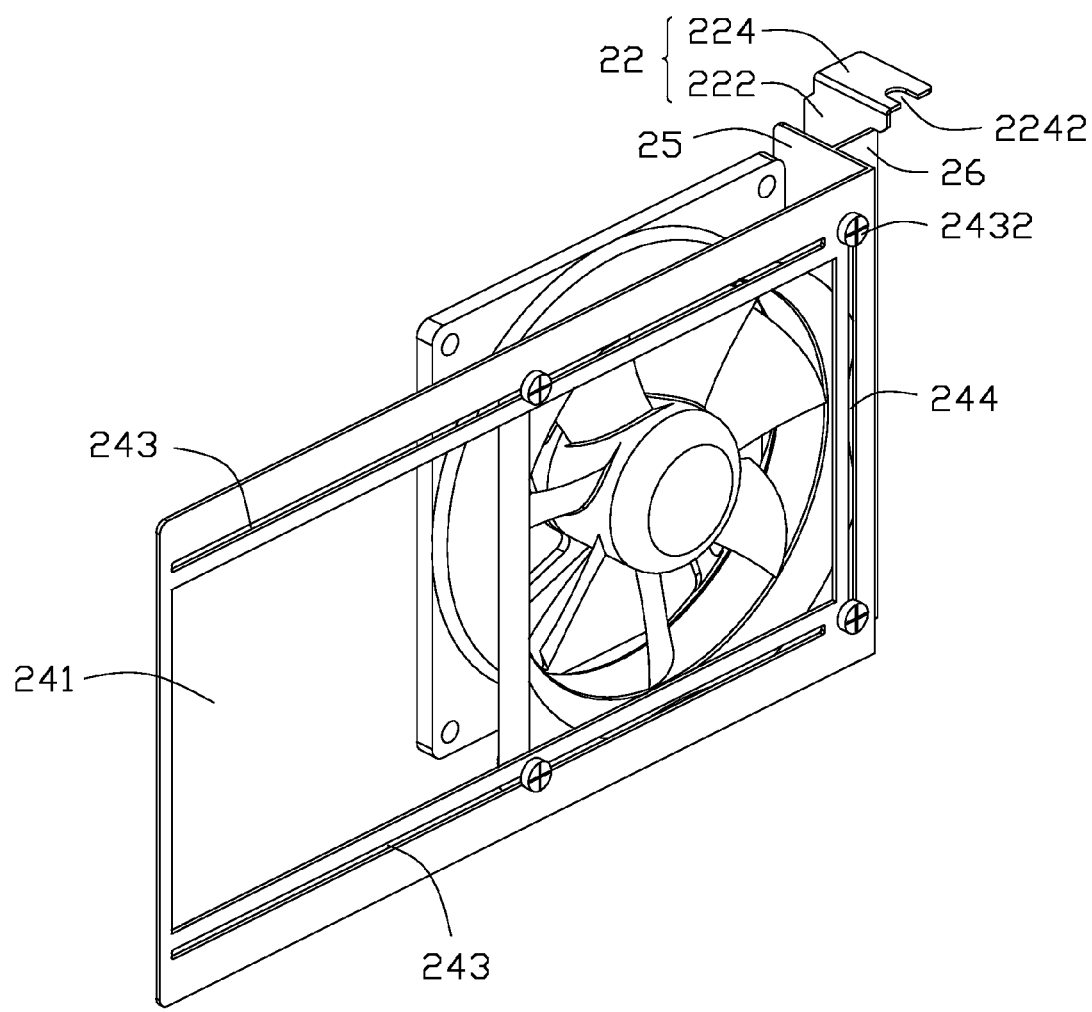
FIG. 4 is similar to FIG. 3, but viewed from another perspective.
Figure 5:
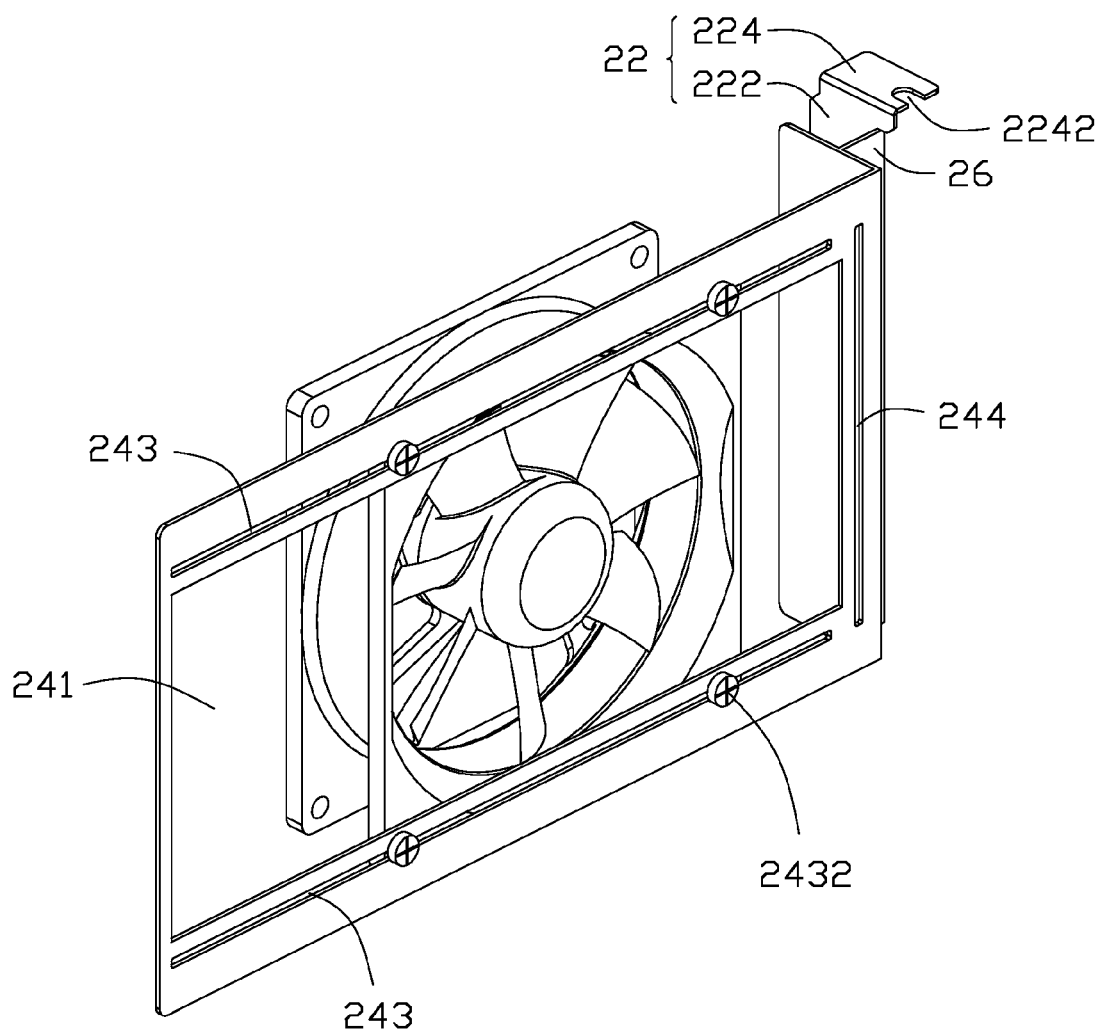
FIG. 5 is similar to FIG. 4, but showing the fan located at a second position of the fixing bracket.

Referring to FIGS. 3 to 4, in assembling the fan 10 with the fixing bracket 20, if a distance between two adjacent screw holes 12 of the fan 10 is equal to a distance between the two first slots 243 of the base board 24, four screws 2432 are respectively extended through the first slots 243 and engaged in the screw holes 12 (see FIG. 6), or two screws 2432 are respectively extended through the first slots 243, and another two screws 2432 are extended through the second slot 244, and then engaged in the screw holes 12 of the fan 10 (see FIG. 5). If the distance between two adjacent screw holes 12 of the fan 10 is less than the distance between the two first slots 243 of the base board 24, only three screws 2432 are needed to mount the fan 10 to the fixing bracket 20, one of which is extended through one of the first slots 243 and the other two are extended through the second slot 244, and then are engaged in the screw holes 12 of the fan 10. A first side of the fan 10 faces the opening 241 of the fixing bracket 20.

Figure 6:
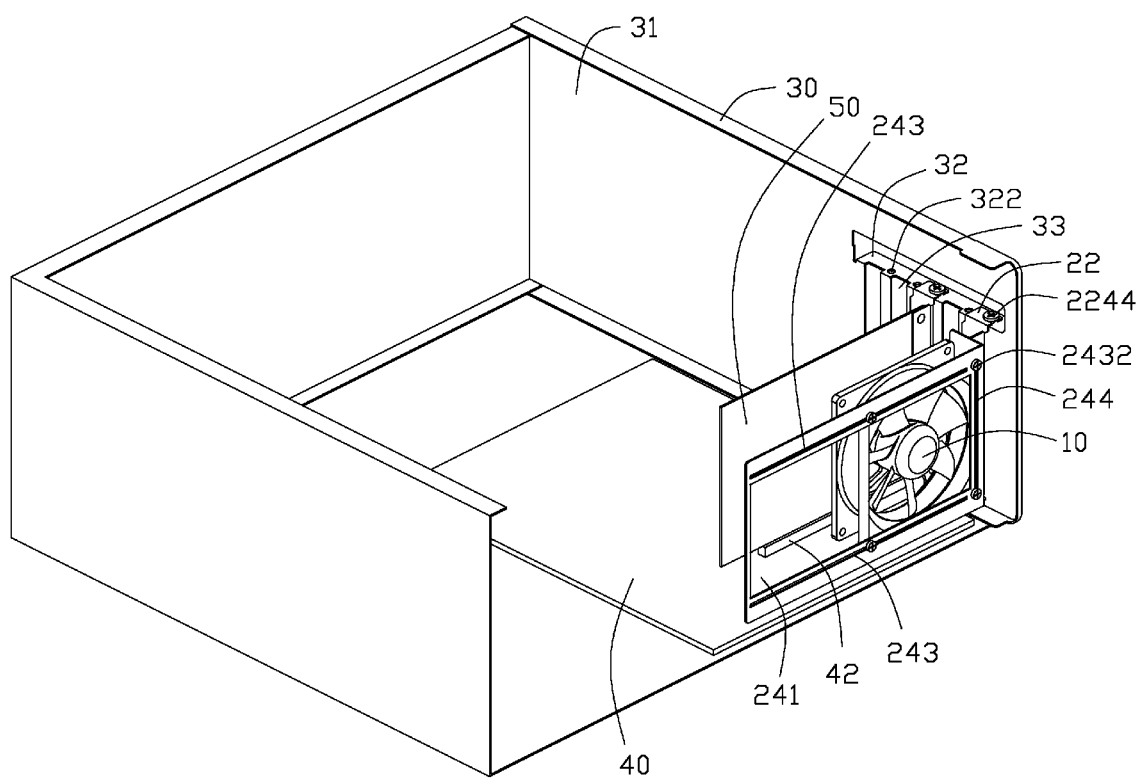
FIG. 6 is an assembled, isometric view of a computer with the combined assembly of the fan and the fixing bracket of FIG. 4.
Figure 7:
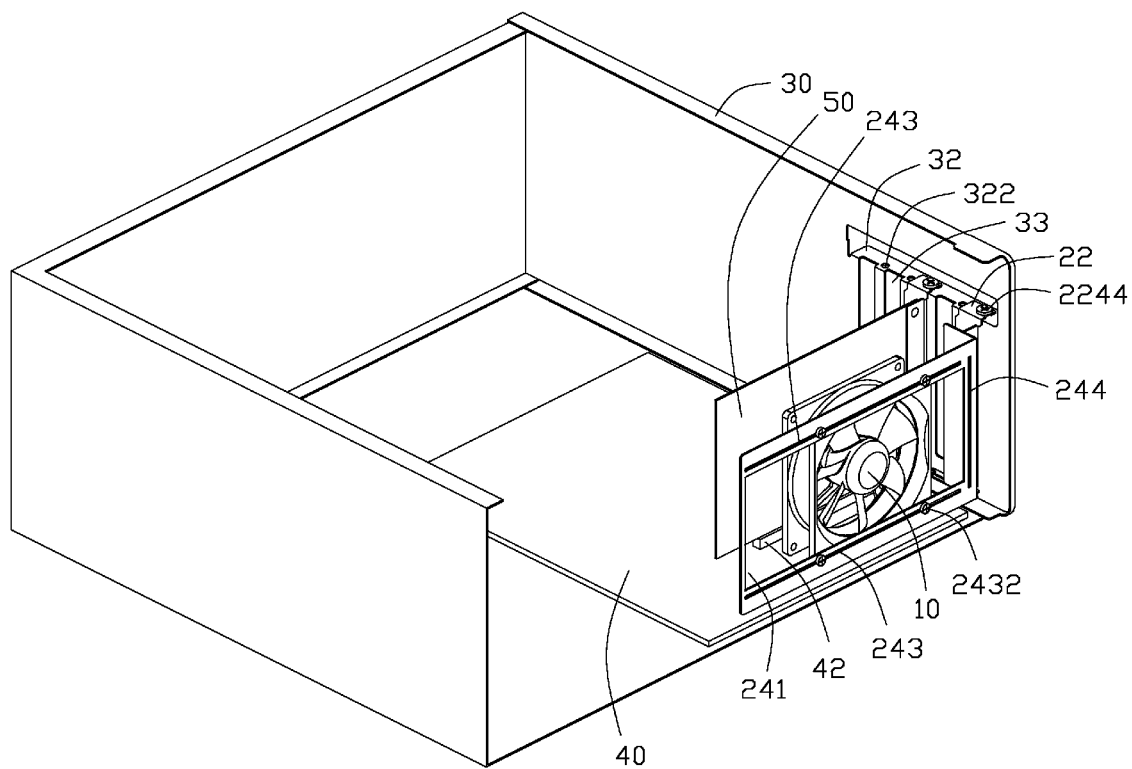
FIG. 7 is similar to FIG. 6, but showing the fan located at the second position of the fixing bracket.

Referring to FIGS. 6 and 7, in assembling the combined assembly of the fixing bracket 20 and the fan 10 to the chassis 30, the assembly is supported on the motherboard 40 and faces the PCI card 50 with a second side of the fan 10 opposite to the first side, a screw 2244 is extended through the incision 2244 of the fixing element 22 and engaged in one of the plurality of fixing holes 322 of the chassis 30. Therefore, the fixing bracket 20 is mounted to the fixing portion 32 of the chassis 30, with the cover plate 222 of the fixing element 22 covering a corresponding slot 33 of the rear wall 31 of the chassis 30, and the fan 10 is just above some idle PCI sockets 42 and facing the PCI card 50 which is inserted in one of the plurality of sockets 42 nearby the fixing bracket 20. If all the screws 2432 are in the first slots 243, the position of the fan 10 on the base board 24 is able to be regulated along the first slots 243, according to location of the PCI card 50, to improve cooling efficiency for the PCI card 50.

In other embodiments, two holding elements may be movably mounted to the first slots 243. A hole may be defined in each holding element to fix the fan 10. It is able to adjust a distance between the two holding elements according to the distance of two adjacent screw holes 12 of the fan 10.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A computer, comprising:
 a motherboard comprising a peripheral component interconnect (PCI) socket mounted on the motherboard;
 a chassis receiving the motherboard therein, the chassis comprising a wall perpendicular to the motherboard and the PCI socket, the wall comprising a fixing portion perpendicularly extending from the wall and parallel to the motherboard;
 a PCI card comprising a first side and a second side perpendicularly connected to the first side, the first side is engaged with the PCI socket of the motherboard, the second side is mounted to the fixing portion of the wall;

a fan; and a fixing bracket comprising a base board and a fixing element connected to the base board, wherein the base board defines an opening, and two first slots at a top side and a bottom side of the opening, the fan is mounted to the base board via fasteners extending through the first slots to engage with the fan, with a first side of the fan facing the opening; the fixing element is fixed to the wall of the chassis, therefore the base board is parallel to the PCI card, with a second side of the fan opposite to the first side facing the PCI card, wherein positions of the fasteners in the corresponding first slots are adjustable to adjust a position of the fan.

2. The computer of claim 1, wherein the base board further defines a second slot at an end of the opening and adjacent to the fixing element, allowing screws to extending through one of the first slots and the second slot to engage with the fan, thereby fixing the fan to the base board adjacent to the fixing element.

3. The computer of claim 1, wherein the wall defines two slots under the fixing portion and perpendicular to the motherboard, the second side of the PCI card is attached to one of the slots, and the fixing element covers the other slot.

4. The computer of claim 3, wherein a flange perpendicularly extends from an end of the base board, the fixing element comprises a cover plate covering the corresponding slot of the wall and parallel to the flange, and a tab perpendicularly extending from a top of the cover plate to be fixed to the fixing portion of the wall, the fixing bracket further comprises a connection plate perpendicularly connected between the flange and the cover plate.

5. A fixing bracket for mounting a fan to a wall of a computer, the fixing bracket comprising:

a base board to be mounted to the computer and perpendicular to the wall, the base board defining an opening, and two first slots at opposite sides of the opening, wherein the first slots allow fasteners to extend through to engage with the fan, thereby making the fan face the opening, wherein positions of the fasteners in the corresponding first slots are adjustable to adjust a position of the fan; and a fixing element attached to the base board and fixed to the wall.

6. The fixing bracket of claim 5, wherein the base board further defines a second slot therein at an end of the opening, adjacent to the fixing element and along a direction perpendicular to the first slots, to fix the fan to the base board adjacent to the fixing element.

7. The fixing bracket of claim 5, further comprising a connection plate, wherein a flange perpendicularly extends from an end of the base board, the fixing element comprises a plate cover to cover the wall and parallel to the flange, the connection plate is perpendicularly connected between the flange and the cover plate.

8. A computer for mounting a fan, the computer comprising:

a wall comprising a fixing portion perpendicularly extending from the wall; and a fixing bracket comprising a base board to fix the fan, and a fixing element connected to the base board to be mounted to the fixing portion of the wall, wherein the base board defines two parallel first slots, wherein the first slots allow fasteners to extend through to engage with the fan, positions of the fasteners in the corresponding first slots are adjustable, to adjust a position that the fan is located on the base board.

9. The computer of claim 8, wherein the base board defines an opening between the first slots, to align with the fan.

10. The computer of claim 8, wherein the fixing bracket further comprises a connection plate, a flange perpendicularly extends from an end of the base board, the fixing element comprises a cover plate attached to the wall and parallel to the flange, and a tab perpendicularly extending from a top of the cover plate and fixed to the fixing portion of the wall, the connection plate is perpendicularly connected between the flange and the cover plate.

11. The computer of claim 8, wherein a slot is defined in the wall, perpendicular to and below the fixing portion, the cover plate of the fixing element covers the slot.

* * * * *